Patented Aug. 10, 1954

2,686,166

UNITED STATES PATENT OFFICE 2,686,166

INCORPORATING OF RUBBER WITH BITUMEN IN ASPHALT PAVING MIXTURES

Norman Henry Taylor, Bombay, India

No Drawing. Application May 7, 1951,
Serial No. 225,077

Claims priority, application Great Britain
May 12, 1950

2 Claims. (Cl. 260—28.5)

This invention relates to the incorporating of rubber with bitumen in asphalt paving mixtures.

The principal objects of adding rubber to bitumen are to give the bitumen elasticity, to increase its ductility and to reduce its susceptibility to temperature changes. The effectiveness of rubber in bringing about these desirable changes depends on the extent to which the rubber dissolves in the bitumen. To dissolve readily, the rubber must be unvulcanised and be in a finely divided state. Rubber exists in this condition in the form of latex, and it is known to add rubber in this form both to bitumen emulsions and to hot bitumen and to add rubber in the forms of vulcanised and unvulcanised rubber powder to hot bitumen and to asphalt paving mixtures during the process of mixing.

In the preparation of asphalt paving mixtures using bitumen in which rubber in the form of latex has already been incorporated, I find that certain difficulties arise. If, for example, from 2 to 5% by weight of rubber in the form of latex is added directly to hot bitumen, for instance at a temperature of 150° C., there is a rapid evolution of steam and consequent foaming but this may be controlled by stirring and the water in the latex may be driven off by maintaining the composition at a temperature exceeding 100° C. If the temperature of the composition is not allowed to exceed 165° C., the resulting water-free rubberised bitumen will be very elastic, will have a high ductility and have a much reduced tendency to flow under the influence of heat. Even at a temperature of 165° C., the material will be highly viscous. If the temperature during manufacture is raised, for instance to 190° C., the viscosity will be reduced and the rubberised bitumen will flow readily even when the temperature is reduced once more to 165° C. The resulting material will not, however, have the high elasticity, ductility and the reduced susceptibility to temperature changes of a composition which had not been subjected to temperatures over 165° C.

In the manufacture of asphalt paving for road surfacing and the like, the temperature of the bitumen is raised until its fluidity is such that it will mix readily with the aggregate. If it is desired to use a rubberised bitumen in an asphalt paving mixture and, for instance, latex is added to bitumen having a pentration of 90 at 25° C. in a quantity which will result in a rubberised bitumen containing 5% by weight of rubber, the temperature during manufacture not being allowed to exceed 165° C., the rubberized bitumen will be highly viscous at the maximum temperature and cannot be mixed effectively with the aggregate. If, alternatively, the fluidity of the rubberised bitumen is increased by raising the temperature, either during or after manufacture, appreciably above 165° C. with the object of facilitating the mixing of the rubberised bitumen with the aggregate, the asphalt paving in which the rubberised bitumen is incorporated will not have the improved properties which it is desired to impart by using a rubberised bitumen of high elasticity and ductility and reduced susceptibility to temperature changes.

In the method according to this invention, the difficulty of coating the aggregate of an asphalt paving mixture with a highly viscous rubberised bitumen is avoided and the tendency to affect injuriously the properties of the rubberised bitumen by raising its temperature in an attempt to reduce its viscosity is obviated by first coating the aggregate with bitumen, suitably in the normal way in the mixing box of the asphalt mixing plant and to the bitumen coated aggregate adding stable latex and mixing until the latex has been distributed throughout the mixture, the temperature not being allowed to exceed 165° C. during and after incorporation of the latex.

During mixing in a mixer of the type used on asphalt mixing plants, the latex is distributed in so thin a film and with such violent agitation at a temperature which does not normally fall below 150° C., that most of the water contained in the latex will evaporate within 30 to 60 seconds of its being added. Any small quantity of water left in the mixture will have no injurious effects. As the rubber in the latex is in the form of microscopic particles and is unvulcanised, it dissolves in the hot bitumen rapidly and within about ten seconds of the latex being added, the mixture appears to increase considerably in volume, assumes a distinctive rubberised appearance and becomes somewhat stiffer than before the latex was added.

Since the mixture has to be spread and consolidated on the road, the necessity of retaining a workable mixture sets a limit to the quantity of rubber which may be incorporated with the bitumen by means of the method proposed. This limit will vary with the penetration or fluidity of the bitumen and is about 5% by weight when a bitumen having a penetration of 90 at 25° C. is employed. Preferably, bitumen of a penetration in the range 40–200 is employed and latex to give a rubber content in the range 2–6%, the smaller amount of rubber corresponding to the more viscous bitumen. The latex must be stable or be stabilised against premature coagulation during mixing and may be compounded for cure so that vulcanisation takes place after the rubber has been dissolved by the bitumen. The latex may be natural rubber latex or a synthetic rubber latex.

The following examples illustrate various embodiments of this invention, the parts referred to being by weight.

*Example 1*

A centrifuged latex having a dry rubber content of 60% was compounded for cure and stabilised in accordance with the following formula:

| | Parts |
|---|---|
| Latex | 1125 |
| Accelerator | 6.8 |
| Sulphur | 13.6 |
| Zinc oxide | 13.6 |
| Dispersing agent | 20.5 |
| Water | 45.5 |

The accelerator used was sodium diethyldithiocarbamate sold under the registered trade-mark (Vulcafor S. D. C.), but any other giving a cure at atmospheric temperature could be substituted, the proportions of sulphur and zinc oxide then being as recommended by the suppliers of the accelerator. The dispersing agent used was the disodium salt of dinaphthyl-methane disulphonic acid that is sold under the registered trade-mark (Dispersol L. N.), but any of the well known methods of stabilising the latex could be used as an alternative.

An asphalt paving mixture was then prepared by heating with bitumen in a normal asphalt mixing plant, granite dust of the following grading:

| | Per cent |
|---|---|
| Passing 200 mesh | 4.84 |
| Passing 80 mesh and retained 200 mesh | 6.30 |
| Passing 50 mesh and retained 80 mesh | 6.25 |
| Passing 40 mesh and retained 50 mesh | 2.50 |
| Passing 30 mesh and retained 40 mesh | 4.88 |
| Passing 20 mesh and retained 30 mesh | 6.30 |
| Passing 10 mesh and retained 20 mesh | 19.48 |
| Passing ¼ in. mesh and retained 10 mesh | 41.65 |
| Passing ⅜ in. mesh and retained ¼ in. mesh | 7.80 |
| | 100.00 |

No particular merit is attached to the above grading, which was of a typical stone dust used for fine asphalt paving mixtures.

The granite dust, at a temperature of 175° C. was elevated to a twin shaft paddle mixer in which an asphalt paving mixture was prepared having the following composition:

| | Parts |
|---|---|
| Granite dust | 26,780 |
| Limestone filler | 2,475 |
| 75 penetration bitumen | 1,890 |

The limestone filler, 80% of which passed a 200 mesh sieve, was added cold immediately after the introduction of the bitumen, this being normal asphalt mixing technique. The use of limestone filler is not an essential part of this process and any of the fillers used in preparing asphalt paving mixtures might be substituted. The temperature of the bitumen coated aggregate when mixing was complete, the time being approximately one minute, was 160° C. To the hot bitumen coated aggregate the compounded latex was added in a thin stream, passing from one end of the mixing box to the other to ensure thorough distribution. The amount of compounded latex used per box of asphalt paving mixture was 105 parts and the percentage of dry rubber on the weight of the bitumen was therefore about 3%.

Almost immediately after the latex was added, the mixture assumed a distinctive fluffy appearance and a close examination revealed thin threads of rubberised bitumen connecting the particles of aggregate. The temperature of the mixture when it was discharged from the mixing box, approximately thirty seconds after the latex was added, was 150° C. The mixture was laid, raked and consolidated in a manner exactly similar to that employed with asphalt mixture containing no rubber.

By way of comparison, a further mixture was made in exactly the same manner except that the temperature at the time of adding the compounded latex was 180° C. The addition of the latex had no visible effect on the asphalt paving mixture and no threads of rubberised bitumen could be distinguished between the particles of aggregate.

*Example 2*

In this example a proprietary latex consisting of a rubber latex generally concentrated to approximately 75% or slightly less and stabilized with alkali metal hydroxide and a soap which is sold under the trade name "Standard Revertex" was used. This product, highly stable, having a dry rubber content of 65.3% was used in place of a compounded and stabilised centrifuged latex. Water was added to the latex to reduce the dry rubber content to 55%, thus rendering the latex less viscous. The latex was added without further treatment to an asphalt paving mixture of the same composition as that described in Example 1, the temperature of the paving mixture being approximately 160° C. at the time of addition and the quantity of latex added being that required to give a rubberised bitumen containing 3% of rubber by weight.

No coagulation occurred and the mixture had the same distinctive appearance as one in which a compounded centrifuged latex had been used.

*Example 3*

In this example "Standard Revertex" was again used, water being added to reduce the dry rubber content to 55% but the bitumen used was of a higher penetration than that used in the previous example, being 200 penetration bitumen, and the proportion of rubber was increased to give a product containing 5.24% of rubber. The amount of granite dust, limestone and bitumen were as in Example 1.

The resulting mixture could be laid and consolidated without any difficulty.

An exactly similar mixture, prepared under similar conditions except that bitumen of 35 penetration was used, proved to be too stiff to lay to an even surface by hand and consolidation was inadequate.

I claim:

1. In a process for the production of dry rubberised asphalt paving mixtures by coating aggregate with liquified bitumen and then incorporating stable latex, the step of incorporating the latex in the coated aggregate at a temperature of above 100° C. and below 165° C., and the step of driving off water by agitation at between the same temperature limits, the temperature not being allowed to exceed 165° C. after incorporation of the latex, the bitumen having a penetration at 25° C. in the range 40–200 and the latex being used in an amount to give a rubber content, based on the bitumen, of 2–6% by weight, the smaller rubber content corresponding to the more viscous bitumen.

2. A process as set forth in claim 1, wherein the temperature is maintained at 150–160° C. during said incorporation and is not allowed subsequently to exceed 160° C.

References Cited in the file of this patent

UNITED STATES PATENTS

| Number | Name | Date |
|---|---|---|
| 1,614,348 | Cresson | Jan. 11, 1927 |
| 1,758,913 | Sadtler | May 13, 1930 |
| 2,148,128 | McIntyre | Feb. 21, 1939 |

FOREIGN PATENTS

| Number | Country | Date |
|---|---|---|
| 376,033 | Great Britain | July 7, 1932 |
| 453,843 | Great Britain | Sept. 18, 1936 |
| 460,526 | Great Britain | Jan. 29, 1937 |